(12) United States Patent
Pan

(10) Patent No.: US 9,263,905 B2
(45) Date of Patent: Feb. 16, 2016

(54) ALTERNATING CURRENT DIGITAL UNIVERSAL CHARGER

(75) Inventor: Jinhai Pan, Shenzhen (CN)

(73) Assignee: SHENZHEN BENMER ELECTRONICS CO., LTD, Shenzhen, Guangdong (CN)

( * ) Notice: Subject to any disclaimer, the term of this patent is extended or adjusted under 35 U.S.C. 154(b) by 305 days.

(21) Appl. No.: 13/979,590

(22) PCT Filed: Nov. 3, 2011

(86) PCT No.: PCT/CN2011/081742
§ 371 (c)(1),
(2), (4) Date: Sep. 6, 2013

(87) PCT Pub. No.: WO2012/094918
PCT Pub. Date: Jul. 19, 2012

(65) Prior Publication Data
US 2014/0049220 A1    Feb. 20, 2014

(30) Foreign Application Priority Data
Jan. 13, 2011   (CN) .......................... 2011 1 0007143

(51) Int. Cl.
*H02J 7/00*   (2006.01)
(52) U.S. Cl.
CPC ............. *H02J 7/0052* (2013.01); *H02J 7/0042* (2013.01)

(58) Field of Classification Search
CPC ...................................................... H02J 7/0042
USPC ........................................................... 320/110
See application file for complete search history.

(56) References Cited

U.S. PATENT DOCUMENTS

| 5,543,702 | A  | * | 8/1996 | Pfeiffer ......................... 320/110 |
| 2007/0159133 | A1 | * | 7/2007 | Kang et al. .................... 320/107 |
| 2011/0025259 | A1 | * | 2/2011 | Toya et al. .................... 320/107 |
| 2011/0298423 | A1 | * | 12/2011 | Ejeil ............................ 320/111 |
| 2012/0049800 | A1 | * | 3/2012 | Johnson et al. ............... 320/111 |
| 2015/0035472 | A1 | * | 2/2015 | Yang ............................ 320/103 |

* cited by examiner

*Primary Examiner* — Suchin Parihar

(57) ABSTRACT

An AC digital universal charger is provided, wherein a button spring and a pushing button are provided at a middle part of a pushing cover; a pressure baffle is provided at a front part of the pushing cover; an AA cathode spring, a pressure spring and an AA cathode hardware are provided on the pressure baffle; a positioning bolt is connected to a positioning block; the positioning block and the pressure clasp are mounted to a lower part of the pushing slip cover via an AA cathode connecting screw and an AA cathode connecting hardware; and the clasp bolt is further connected to a lower part of the pushing button by inserting. A battery is positioned and charged by energizing the charger, putting the battery at a battery zone, adjusting the charger buttons, pressing down the pushing button to further press the battery tightly and then releasing the pushing button.

9 Claims, 4 Drawing Sheets

ALTERNATING CURRENT DIGITAL UNIVERSAL CHARGER

CROSS REFERENCE OF RELATED APPLICATION

This is a U.S. National Stage under 35 U.S.C. 371 of the International Application PCT/CN2011/081742, filed Nov. 3, 2011, which claims priority under 35 U.S.C. 119(a-d) to CN 201110007143.1, filed Jan. 13, 2011.

BACKGROUND OF THE PRESENT INVENTION

1. Field of Invention

The present invention relates to a multifunctional charger.

2. Description of Related Arts

The conventional battery chargers have a wide variety, such as the chargers for the lithium batteries specialized for the electronic digital products, the chargers for the mobile phone batteries, the USB chargers and the chargers for the rechargeable AA/AAA batteries. However, the above different types of chargers are mutually irreplaceable, which causes a waste of resources and is harmful to the environment; meanwhile, the conventional charger always comprises two detachable parts, the wired adapter and the charging dock, so as to bring inconvenience to the users.

SUMMARY OF THE PRESENT INVENTION

The conventional battery chargers have a wide variety, such as the chargers for the lithium batteries specialized for the electronic digital products, the chargers for the mobile phone batteries, the USB chargers and the chargers for the rechargeable AA/AAA batteries. However, the above different types of chargers are mutually irreplaceable, which causes a waste of resources and is harmful to the environment; meanwhile, the conventional charger always comprises two detachable parts, the wired adapter and the charging dock, so as to bring inconvenience to the users. Thus it is necessary to provide an alternating current (AC) digital universal charger.

An AC digital universal charger, provided by the present invention, comprises a transparent cover, a rubber cushion, a charger top shell, a right rail supporter, a right rail button, a rail supporter, a right contacting hardware, a right connecting hardware, a connecting hardware screw, a high-pressure baffle, a DC (direct current) seat, an AA anode hardware, a USB seat, a PCB (printed circuit board), a plug socket screw, an AC hardware socket, an AC hardware, a bottom shell, an AC plug, first nickel sheets, a second nickel sheet, a left rail button, a left rail supporter, a left contacting hardware, a pressure baffle, an anti-skidding rubber cushion, a positioning bolt, a positioning block, a clasp bolt, a pressure clasp, an AA cathode connecting screw, an AA cathode connecting hardware, a pushing slip cover, a button spring, a pushing button, an AA cathode spring, a pressure spring and an AA cathode hardware, wherein a bottom of the bottom shell is connected to the AC plug; the AC hardware, provided on the bottom shell, is electrically connected to the AC plug; the AC hardware socket is mounted on the bottom shell via the plug socket screw; the PCB is mounted on the bottom shell; the DC seat, the AA anode hardware, the USB seat, the two first nickel sheets and the second nickel sheet are respectively mounted on the PCB; the high-pressure baffle is further provided above the PCB; the right rail button is provided on the right rail supporter and the rail supporter is mounted on the right rail supporter; the left rail button is provided on the left rail supporter; the right contacting hardware and the right connecting hardware are connected via the connecting hardware screw; the right rail supporter is stuck within the right contacting hardware and the left rail supporter is stuck within the left contacting hardware; the right contacting hardware and the left contacting hardware are provided between the high-pressure baffle and the charger top shell; the transparent cover is provided on the charger top shell; the pushing slip cover is provided at a tail part on the charger top shell; the button spring and the pushing button are provided at a middle part of the pushing slip cover; the pressure baffle is provided at a front part of the pushing slip cover; the AA cathode spring, the pressure spring and the AA cathode hardware are provided on the pressure baffle; the positioning bolt is connected to the positioning block; the clasp bolt is connected to the pressure clasp by inserting; the positioning block and the pressure clasp are mounted to a lower part of the pushing slip cover via the AA cathode connecting screw and the AA cathode connecting hardware; the clasp bolt is further connected to a lower end of the pushing button by inserting; and the anti-skidding rubber cushion is provided at a front end of the AA cathode hardware and the rubber cushion is provided on the charger top shell which corresponds to the anti-skidding rubber cushion.

The AC digital universal charger, provided by the present invention, has following advantages.

Firstly, pushing the left and the right rail buttons respectively drive the left rail supporter, the left contacting hardware, the right rail supporter, the right contacting hardware and the right connecting hardware to move, which facilitates aligning and calibrating an anode and an cathode of a battery to be charged, so as to accomplish charging different types of batteries.

Secondly, the pressure baffle prevents the battery to be charged from falling off, wherein the pushing slip cover applies forces on the AA cathode spring and the pressure spring, in such a manner that the pressure baffle presses the battery to be charged tightly via the anti-skidding rubber cushion to prevent the battery to be charged from falling off.

Thirdly, the pressure clasp is able to fix the pushing slip cover, wherein, after the pushing slip cover is pushed to drive the pressure baffle to press the battery to be charged tightly, the pressure clasp is locked up with the charger top shell after releasing the pushing button, which prevents the pushing slip cover from loosening.

Fourthly, the hardware elements of the AC digital universal charger have convex parts and are able to move upwardly, downwardly, forwardly and backwardly; the hardware elements, all in an identical structure, are able to operate at multi-directions and are flexible and convenient for usage.

Fifthly, the contacting hardware elements are connected via the rail hardware elements to accomplish charging.

Sixthly, the AC power source part and the charging part are integrated into the whole charger.

The AC digital universal charger, provided by the present invention, is suitable for charging the lithium batteries specialized for various electronic digital products, the mobile phone batteries, the rechargeable AA/AAA batteries and the various devices having USB outputs.

These and other objectives, features, and advantages of the present invention will become apparent from the following detailed description, the accompanying drawings, and the appended claims.

DETAILED DESCRIPTION OF THE PREFERRED EMBODIMENT

Figure 1:
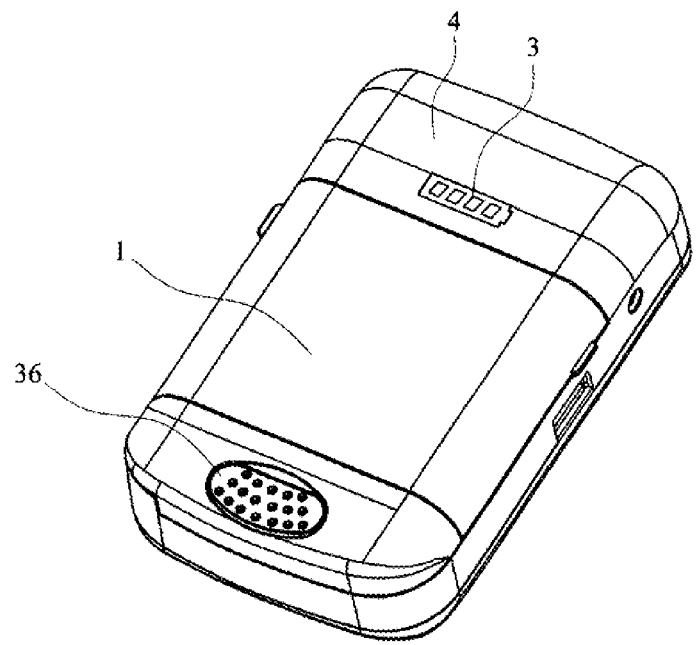
FIG. 1 is a front view of an AC digital universal charger according to a preferred embodiment of the present invention.
Figure 2:
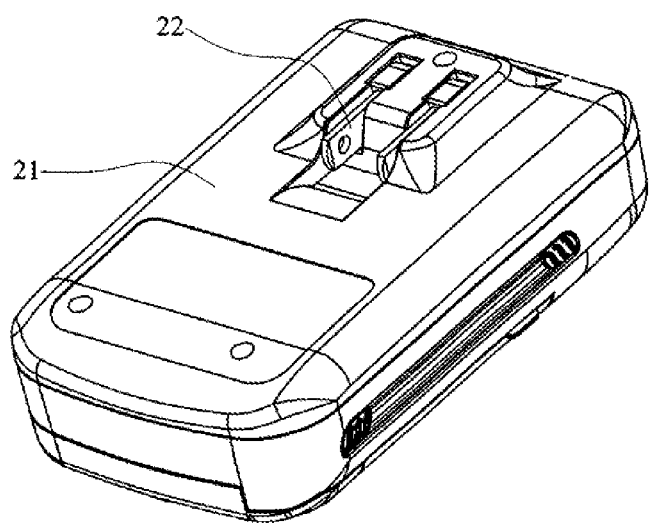
FIG. 2 is a bottom view of the AC digital universal charger according to the preferred embodiment of the present invention.
Figure 3:
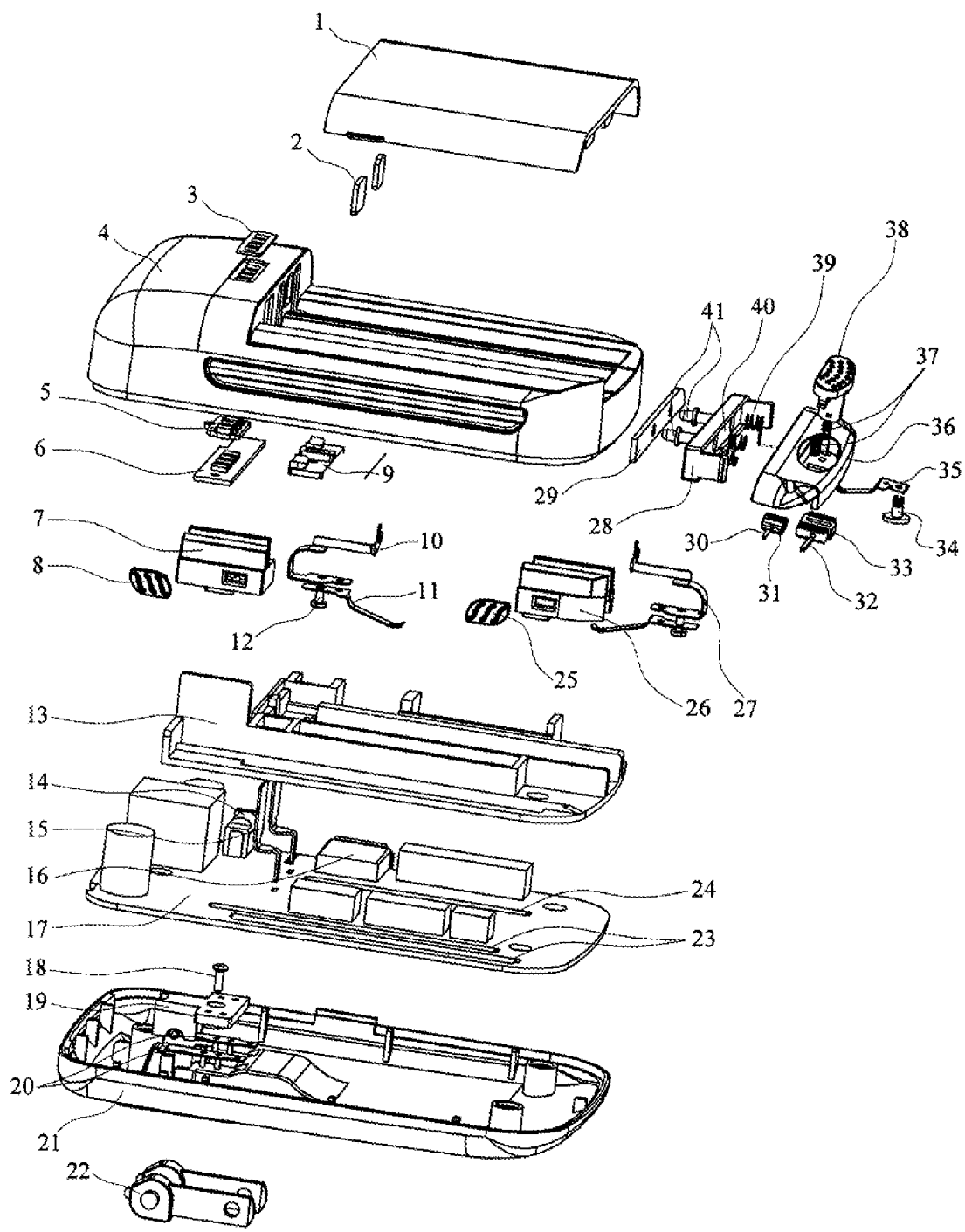
FIG. 3 is an exploded view of the AC digital universal charger according to the preferred embodiment of the present invention.
Figure 4:
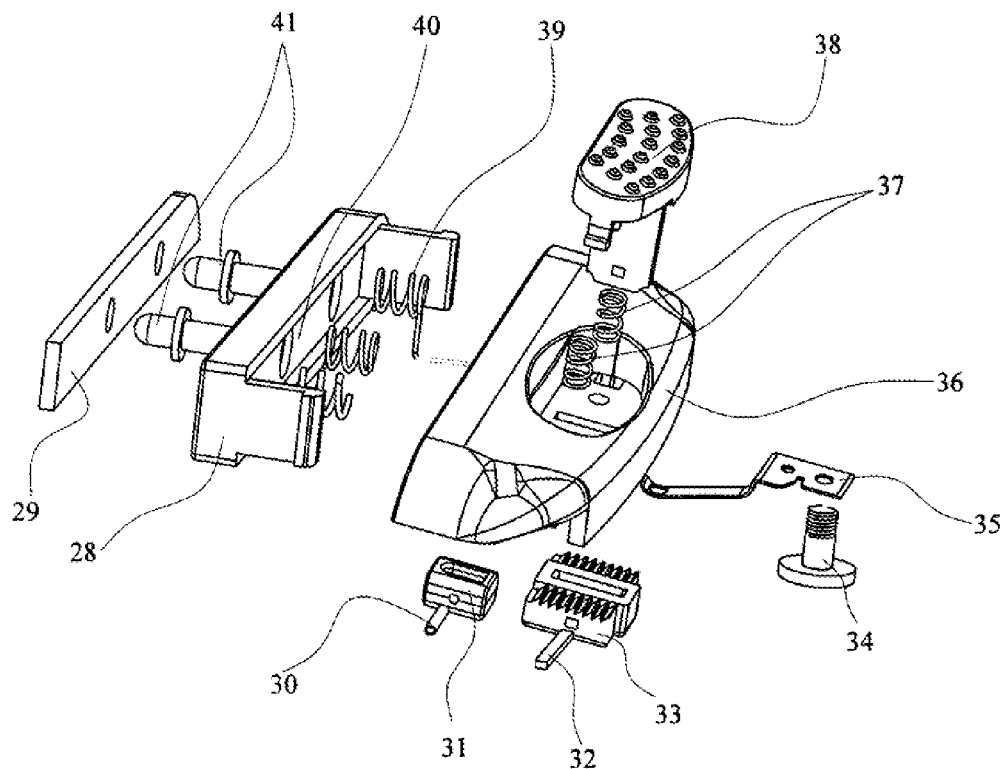
FIG. 4 is an enlarged view of a pressure baffle 28, an anti-skidding rubber cushion 29, a positioning bolt 30, a positioning block 31, a clasp bolt 32, a pressure clasp 33, an AA cathode connecting screw 34, an AA cathode connecting hardware 35, a pushing slip cover 36, a button spring 37, a pushing button 38, an AA cathode spring 39, a pressure spring 40 and an AA cathode hardware 41 according to the preferred embodiment of the present invention.
Figure 5:
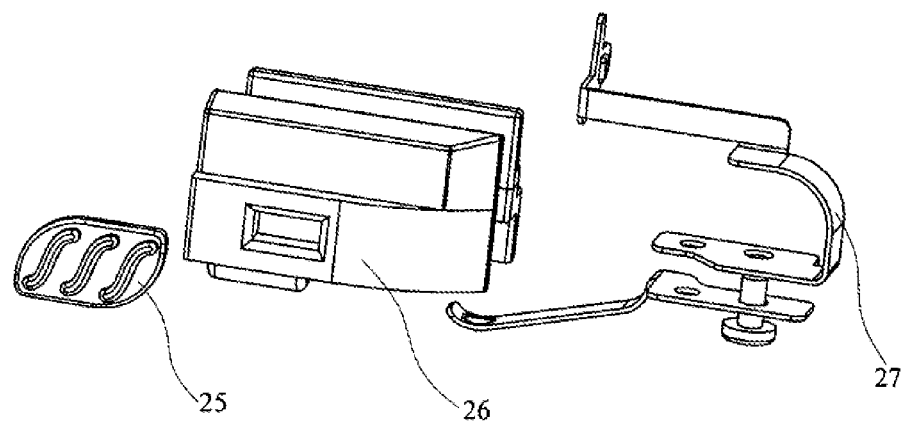
FIG. 5 is an enlarged view of a left rail button 25, a left rail supporter 26 and a left contacting hardware 27 according to the preferred embodiment of the present invention.
Figure 6:
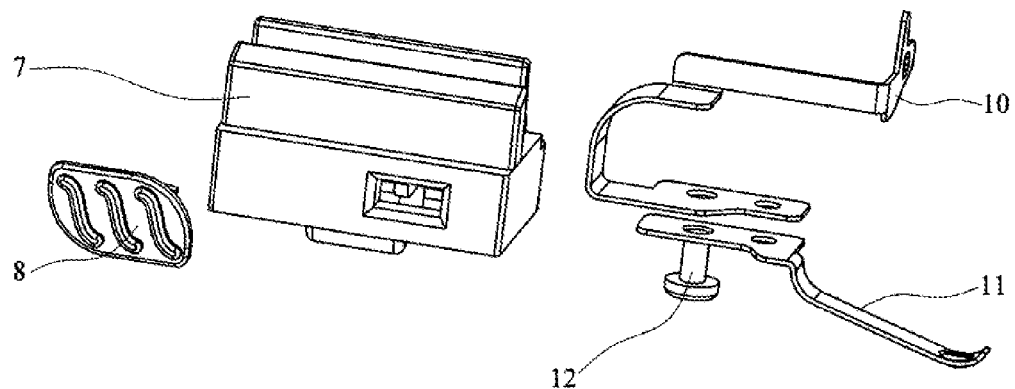
FIG. 6 is an enlarged view of a right rail supporter 7, a right rail button 8, a right contacting hardware 10, a right connecting hardware 11 and a connecting hardware screw 12 according to the preferred embodiment of the present invention.
Figure 7:
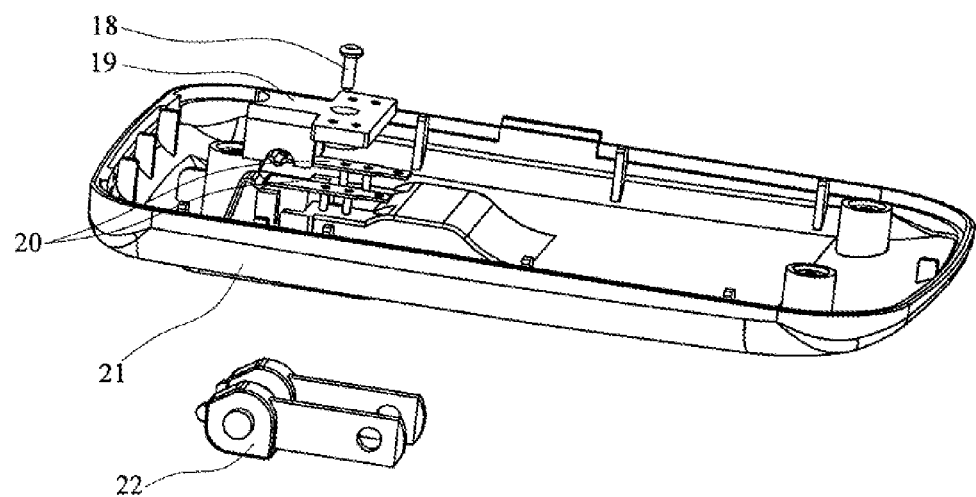
FIG. 7 is an enlarged view of a plug socket screw 18, an AC hardware socket 19, an AC hardware 20, a bottom shell 21 and an AC plug 22 according to the preferred embodiment of the present invention.

Referring to FIGS. 1 to 7 of the drawings, according to a preferred embodiment of the present invention, an AC digital universal charger comprises a transparent cover 1, a rubber cushion 2, a charger top shell 4, a right rail supporter 7, a right rail button 8, a rail supporter 9, a right contacting hardware 10, a right connecting hardware 11, a connecting hardware screw 12, a high-pressure baffle 13, a DC seat 14, an AA anode hardware 15, a USB seat 16, a first PCB 17, a plug socket screw 18, an AC hardware socket 19, an AC hardware 20, a bottom shell 21, an AC plug 22, first nickel sheets 23, a second nickel sheet 24, a left rail button 25, a left rail supporter 26, a left contacting hardware 27, a pressure baffle 28, an anti-skidding rubber cushion 29, a positioning bolt 30, a positioning block 31, a clasp bolt 32, a pressure clasp 33, an AA cathode connecting screw 34, an AA cathode connecting hardware 35, a pushing slip cover 36, a button spring 37, a pushing button 38, an AA cathode spring 39, a pressure spring 40 and an AA cathode hardware 41. A bottom of the bottom shell 21 is connected to the AC plug 22. The AC hardware 20, provided on the bottom shell 21, is electrically connected to the AC plug 22. The AC hardware socket 19 is mounted on the bottom shell 21 via the plug socket screw 18. The first PCB 17 is mounted on the bottom shell 21. The DC seat 14, the AA anode hardware 15, the USB seat 18, the two first nickel sheets 23 and the second nickel sheet 24 are respectively mounted on the first PCB 17. The high-pressure baffle 13 is further provided above the first PCB 17. The right rail button 8 is provided on the right rail supporter 7. The rail supporter 9 is mounted on the right rail supporter 7. The left rail button 25 is provided on the left rail supporter 26. The right contacting hardware 10 and the right connecting hardware 11 are connected via the connecting hardware screw 12. The right rail supporter 7 is stuck within the right contacting hardware 10. The left rail supporter 26 is stuck within the left contacting hardware 27. The right contacting hardware 10 and the left contacting hardware 27 are provided between the high-pressure baffle 13 and the charger top shell 4. The transparent 1 is provided on the charger top shell 4. The pushing slip cover 36 is provided at a tail part on the charger top shell 4. The button spring 37 and the pushing button 38 are provided at a middle part of the pushing slip cover 36. The pressure baffle 28 is provided at a front part of the pushing slip cover 36. The AA cathode spring 39, the pressure spring 40 and the AA cathode hardware 41 are provided on the pressure baffle 28. The positioning bolt 30 is connected to the positioning block 31. The clasp bolt 32 is connected to the pressure clasp 33 by inserting. The positioning block 31 and the pressure clasp 33 are mounted to a lower part of the pushing slip cover 36 via the AA cathode connecting screw 34 and the AA cathode connecting hardware 35. The clasp bolt 32 is further connected to a lower end of the pushing button 38 by inserting. The anti-skidding rubber cushion 29 is provided at a front end of the AA cathode hardware 41 and the rubber cushion 2 is provided on the charger top shell 4 which corresponds to the anti-skidding rubber cushion 29.

Further, according to the preferred embodiment of the present invention, the AC digital universal charger further comprises a PVC sheet 3 which is provided on an upper part of the charger top shell 4.

The AC digital universal charger further comprises a light-guiding column 5 and a second PCB 6, wherein the second PCB 6 has a LED indicating light; the light-guiding column 5 is provided on the second PCB 6; and the second PCB 6, provided below the PVC sheet 3 within the charger top shell 4, is able to indicate states of charging.

The AC digital universal charger has following connections, operation principles and parameters.

Firstly, the bottom shell 21 and the charger top shell 4 are mainly for fixing internal elements which comprise the pushing slip cover 36 and the first PCB 17.

Secondly, a charging contact manner of a battery comprises pushing the right rail button 8 and pushing the left rail button 25 which respectively drive the right rail supporter 7, the right rail contacting hardware 10, the right connecting hardware 11, the left rail supporter 26 and the left contacting hardware 27 to move. An operation principle thereof comprises that the right contacting hardware 10 and the right connecting hardware 11 are provided on the right rail supporter 7; the left contacting hardware 27 is provided on the left rail supporter 26; the connecting hardware screw 12 fixates the right contacting hardware 10 and the right connecting hardware 11; and the right rail button 8 and the left rail button 25 are respectively mounted on the right rail supporter 7 and the left rail supporter 26, in such a manner that the hardware elements are able to move and that the right contacting hardware 10 and the left contacting hardware 27 are able to align and calibrate according to an anode and a cathode of the battery, so as to properly charge the battery.

Thirdly, the pressure baffle 28, the anti-skidding rubber cushion 29, the AA cathode spring 39, and the AA cathode hardware 41 act with the pushing slip cover 36, the pushing button 38, the button spring 37 and the pressure clasp 33 to prevent the battery from falling off and increase surface friction to protect the battery. An operation principle thereof comprises that the battery which can be a digital battery, an AA battery or an AAA battery is provided at a battery zone of the two rubber cushions; the pressure baffle 28 presses the AA cathode spring 39 tightly via pushing the pushing slip cover 36; then the pressure clasp 33 is locked up with the charger top shell 4 after releasing the pushing button 38, so that the pushing slip cover is fixed, which prevents the battery from falling off and displacing and accomplishes charging the battery properly.

Fourthly, an input voltage of the AC plug 22 is AC 100~240V, 50/60 Hz.

Fifthly, the DC seat 14 inputs a voltage of 12V and a current of 500 mA.

Sixthly, the USB seat 16 outputs a voltage of 5V and a current of 500 mA.

The AC digital universal charger, provided by the present invention, functions by energizing, providing a battery in a zone between the top shell and the slip cover, adjusting the pushing buttons of the charger until the two hardware elements respectively contact an anode and a cathode of the battery and then pushing the slip cover to press the battery tightly, when the indicating LED light starts to flash and the battery starts to be charged.

The AC digital universal charger, provided by the present invention, has an input of alternating current and is able to charge various types of digital batteries, mobile phone batteries, and also digital products such as MP3 and MP4.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An AC digital universal charger, comprising a transparent cover, a rubber cushion, a charger top shell, a right rail supporter, a right rail button, a rail supporter, a right contacting hardware, a right connecting hardware, a connecting hardware screw, a high-pressure baffle, a DC seat, an AA anode hardware, a USB seat, a first PCB, a plug socket screw, an AC hardware socket, an AC hardware, a bottom shell, an AC plug, first nickel sheets, a second nickel sheet, a left rail button, a left rail supporter, a left contacting hardware, a pressure baffle, an anti-skidding rubber cushion, a positioning bolt, a positioning block, a clasp bolt, a pressure clasp, an AA cathode connecting screw, an AA cathode connecting hardware, a pushing slip cover, a button spring, a pushing button, an AA cathode spring, a pressure spring and an AA cathode hardware, wherein a bottom of said bottom shell is connected to said AC plug; said AC hardware, provided on said bottom shell, is connected to said AC plug; said AC hardware socket is mounted on said bottom shell via said plug socket screw; said first PCB is mounted on said bottom shell; said DC seat, said AA anode hardware, said USB seat, said two first nickel sheets and said second nickel sheet are respectively mounted on said first PCB; said high-pressure baffle is further provided above said PCB; said right rail button is provided on said right rail supporter; said rail supporter is mounted on said right rail supporter; said left rail button is provided on said left rail supporter; said right contacting hardware and the right connecting hardware are connected via said connecting hardware screw; said right rail supporter is stuck within said right contacting hardware; said left rail supporter is stuck within said left contacting hardware; said right contacting hardware and said left contacting hardware are provided between said high-pressure baffle and said charger top shell; said transparent cover is provided on said charger top shell; said pushing slip cover is provided at a tail part on said charger top shell; said button spring and said pushing button are provided at a middle part of said pushing slip cover; said pressure baffle is provided at a front part of said pushing slip cover; said AA cathode spring, said pressure spring and said AA cathode hardware are provided on said pressure baffle; said positioning bolt is connected to said positioning block; said clasp bolt is connected to said pressure clasp by inserting; said positioning block and said pressure clasp are mounted to a lower part of said pushing slip cover via said AA cathode connecting screw and said AA cathode connecting hardware; the clasp bolt is further connected to a lower end of said pushing button by inserting; said anti-skidding rubber cushion is provided at a front end of said AA cathode hardware and said rubber cushion is provided on said charger top shell which corresponds to said anti-skidding rubber cushion.

2. The AC digital universal charger, as recited in claim 1, further comprising a PVC sheet provided at an upper part of said charger top shell.

3. The AC digital universal charger, as recited in claim 2, further comprising a light-guiding column and a second PCB, wherein said light-guiding column is provided on said second PCB and said second PCB is provided below said PVC sheet within said charger top shell.

4. The AC digital universal charger, as recited in claim 3, wherein pushing said left rail button and pushing said right rail button respectively drive said left rail supporter, said left contacting hardware, said right rail supporter, said right contacting hardware and said right connecting hardware to move, in such a manner that an anode and a cathode of a battery are aligned and calibrated to charge the battery; the battery is provided between said top shell and said pushing slip cover; said pressure baffle, said anti-skidding rubber cushion, said AA cathode spring, and said AA cathode hardware act with said pushing slip cover, said pushing button, said button spring and said pressure clasp to prevent the battery from falling off and increase surface friction to protect the battery; said right contacting hardware and said left contacting hardware are able to align and calibrate according to the anode and the cathode of the battery, so as to properly charge the battery.

5. The AC digital universal charger, as recited in claim 4, wherein pushing said pushing slip cover applies forces on said AA cathode spring and said pressure spring, in such a manner that said pressure baffle is able to press the battery tightly via said anti-skidding rubber cushion and prevent the battery from falling off.

6. The AC digital universal charger, as recited in claim 5, wherein said pressure baffle presses the battery tightly via pushing said pushing slip cover and then said pressure clasp is locked up with said charger top shell by releasing said pushing button, which prevents said pushing slip cover from loosening.

7. The AC digital universal charger, as recited in claim 6, wherein said hardware elements are all able to move upwardly, downwardly, forwardly and backwardly.

8. The AC digital universal charger, as recited in claim 7, wherein said right contacting hardware and said left contacting hardware are connected via said rail hardware elements to accomplish charging.

9. An AC digital universal charger, comprising: a transparent cover, two rubber cushions, a charger top shell, a right rail supporter, a right rail button, a rail supporter, a right contacting hardware, a right connecting hardware, a connecting hardware screw, a high-pressure baffle, a DC seat, an AA anode hardware, a USB seat, a first PCB, a plug socket screw, an AC hardware socket, an AC hardware, a bottom shell, an AC plug, first nickel sheets, a second nickel sheet, a left rail button, a left rail supporter, a left contacting hardware, a pressure baffle, an anti-skidding rubber cushion, a positioning bolt, a positioning block, a clasp bolt, a pressure clasp, an AA cathode connecting screw, an AA cathode connecting hardware, a pushing slip cover, a button spring, a pushing button, an AA cathode spring, a pressure spring, an AA cathode hardware, a PVC sheet, a light-guiding column and a second PCB, wherein:

a bottom of said bottom shell is connected to said AC plug; said AC hardware, provided on said bottom shell, is connected to said AC plug; said AC hardware socket is mounted on said bottom shell via said plug socket screw; said first PCB is mounted on said bottom shell; said DC seat, said AA anode hardware, said USB seat, said two first nickel sheets and said second nickel sheet are respectively mounted on said first PCB; said high-pressure baffle is further provided above said PCB; said right rail button is provided on said right rail supporter; said rail supporter is mounted on said right rail supporter; said left rail button is provided on said left rail supporter; said right contacting hardware and the right connecting hardware are connected via said connecting hardware screw; said right rail supporter is stuck within said right contacting hardware; said left rail supporter is stuck within said left contacting hardware; said right contacting hardware and said left contacting hardware are provided between said high-pressure baffle and said charger top shell; said transparent cover is provided on said charger top shell; said pushing slip cover is provided at a tail part on said charger top shell; said button spring and said pushing button are provided at a middle part of said pushing slip cover; said pressure baffle is provided at a front part of said pushing slip cover; said AA cathode spring, said pressure spring and said AA cathode hardware are provided on said pressure baffle; said positioning bolt is connected to said positioning block; said clasp bolt is connected to said pressure clasp by inserting; said positioning block and said pressure clasp are mounted to a lower part of said pushing slip cover via said AA cathode connecting screw and said AA cathode connecting hardware; the clasp bolt is further connected to a lower end of said pushing button by inserting; said anti-skidding rubber cushion is provided at a front end of said AA cathode hardware and said rubber cushion is provided on said charger top shell which corresponds to said anti-skidding rubber cushion; said PVC sheet is provided at an upper part of said charger top shell; said light-guiding column is provided on said second PCB and said second PCB is provided below said PVC sheet within said charger top shell;

pushing said left rail button and pushing said right rail button respectively drive said left rail supporter, said left contacting hardware, said right rail supporter, said right contacting hardware and said right connecting hardware to move, in such a manner that an anode and a cathode of a battery are aligned and calibrated to charge the battery; the battery is provided between said top shell and said pushing slip cover, at a battery zone of said two rubber cushions; said pressure baffle, said anti-skidding rubber cushion, said AA cathode spring, and said AA cathode hardware act with said pushing slip cover, said pushing button, said button spring and said pressure clasp to prevent the battery from falling off and increase surface friction to protect the battery; said right contacting hardware and said left contacting hardware are able to align and calibrate according to the anode and the cathode of the battery, so as to properly charge the battery;

pushing said pushing slip cover applies forces on said AA cathode spring and said pressure spring, in such a manner that the pressure baffle is able to press the battery tightly via said anti-skidding rubber cushion and prevent the battery from falling off;

said pressure baffle presses the battery tightly via pushing said pushing slip cover and then said pressure clasp is locked up with said charger top shell by releasing said pushing button, which prevents said pushing slip cover from loosening;

said hardware elements are all able to move upwardly, downwardly, forwardly and backwardly; and said right contacting hardware and said left contacting hardware are connected via said rail hardware elements to accomplish charging.

\* \* \* \* \*